US008867411B2

(12) United States Patent
Ionescu et al.

(10) Patent No.: US 8,867,411 B2
(45) Date of Patent: Oct. 21, 2014

(54) EMERGENCY CALL MODE PREFERENCE IN WIRELESS COMMUNICATION NETWORKS

(75) Inventors: Alexandru C. Ionescu, Seattle, WA (US); Suryo Sukendro, Bellevue, WA (US); Michael Hooker, Bellevue, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 120 days.

(21) Appl. No.: 13/300,485

(22) Filed: Nov. 18, 2011

(65) Prior Publication Data

US 2012/0236760 A1    Sep. 20, 2012

Related U.S. Application Data

(60) Provisional application No. 61/439,330, filed on Feb. 3, 2011.

(51) Int. Cl.
*H04L 12/16* (2006.01)
*H04L 12/66* (2006.01)
*H04L 29/06* (2006.01)
*H04L 29/08* (2006.01)
*H04W 4/22* (2009.01)
*H04W 76/00* (2009.01)
*H04W 88/06* (2009.01)

(52) U.S. Cl.
CPC .............. *H04W 4/22* (2013.01); *H04W 76/007* (2013.01); *H04L 65/1069* (2013.01); *H04L 67/141* (2013.01); *H04W 88/06* (2013.01); *H04L 69/22* (2013.01)
USPC .......................................... 370/259; 370/352

(58) Field of Classification Search
USPC .......................................... 370/259
See application file for complete search history.

(56) References Cited

U.S. PATENT DOCUMENTS

| | | | | |
|---|---|---|---|---|
| 2006/0030290 | A1* | 2/2006 | Rudolf et al. | 455/404.1 |
| 2009/0147929 | A1* | 6/2009 | Zhao | 379/46 |
| 2009/0280770 | A1* | 11/2009 | Mahendran | 455/404.1 |
| 2009/0296689 | A1* | 12/2009 | Bakker et al. | 370/352 |
| 2009/0298458 | A1* | 12/2009 | Bakker et al. | 455/404.1 |
| 2010/0014508 | A1* | 1/2010 | Yang | 370/352 |
| 2010/0232403 | A1* | 9/2010 | Qiu et al. | 370/338 |
| 2011/0099281 | A1* | 4/2011 | Bakker et al. | 709/228 |
| 2011/0188411 | A1* | 8/2011 | Faccin et al. | 370/259 |

* cited by examiner

*Primary Examiner* — Chirag Shah
*Assistant Examiner* — Srinivasa Reddivalam
(74) *Attorney, Agent, or Firm* — Perkins Coie LLP

(57) ABSTRACT

A system and method to determine a type of wireless network that is to be used for an emergency communication session that is initiated at a mobile device. A Session Initiation Protocol (SIP) header is modified to introduce an emergency call mode preference (ECMP) field into the header. When a mobile device registers a session with an IP Multimedia Subsystem (IMS), the ECMP field is populated by the service provider with information that conveys the preferred network to use when an emergency communication session is initiated by a user of the mobile device. In the event of a subsequent request to start an emergency communication session using the mobile device, the mobile device utilizes the preferred network to establish communication.

16 Claims, 7 Drawing Sheets

EMERGENCY CALL MODE PREFERENCE IN WIRELESS COMMUNICATION NETWORKS

CROSS-REFERENCE TO RELATED APPLICATION(S)

This application claims the benefit of U.S. Provisional Patent Application No. 61/439,330, entitled "CONVEYING A LAST KNOWN LOCATION IN A NETWORK, SUCH AS IN A CELLULAR TELEPHONE NETWORK," filed on Feb. 3, 2011, and incorporated herein by reference in its entirety.

BACKGROUND

Mobile devices that can communicate over more than one type of telecommunication network have become increasingly prevalent. For example, dual-mode mobile phones may allow a consumer to connect to wireless wide area networks (WANs) as well as wireless local area networks (LANs). When accessing a cellular WAN (including, but not limited to, networks based on the Global System for Mobile Communications (GSM), IS-95, Universal Mobile Telecommunications System (UMTS), and CDMA-2000 standards), the mobile device may be connected to other mobile or fixed devices or services via a circuit-switched network architecture. When accessing wireless LAN connections (including, but not limited to, networks based on the IEEE 802.11 wireless fidelity (Wi-Fi) standards), the mobile device may be connected to other mobile devices or services via a packet-based network architecture, such as an Internet Protocol based (IP-based) network architecture. Networks that allow mobile devices to access a service provider's core network via wireless LANs are often referred to as Unlicensed Mobile Access (UMA) or Generic Access Networks, since they allow wireless service providers to merge their cellular networks with IP-based wireless networks and provide seamless network service for mobile devices of subscribers.

As used herein, the phrase "mobile device" is broadly intended to refer to portable devices which are capable of accessing wireless networks for voice and/or data communications. Mobile devices may therefore include, but are not limited to, phones, smartphones, tablet computers, notebook computers, laptop computers, personal digital assistants (PDAs), multimedia devices, gaming devices, or other similar mobile devices. As such, mobile devices range widely in terms of capabilities and features.

One challenge of multi-mode mobile devices is connecting a mobile device to emergency services based on the current location of the device. For example, telecommunications service providers may need to route certain calls, such as "911" or other emergency calls, to a public safety access point (PSAP) that is associated with the geographic location of the mobile device. Service providers who operate cellular networks with fixed network infrastructure have a variety of techniques that are available to determine the location of the mobile device within the fixed network infrastructure. Service providers who also allow access through LAN access points have a variety of other techniques that are available to determine the geographic location of the mobile device. The methods used to determine location of mobile device in a cellular network, however, are typically different than the methods used to determination location in a LAN. Such differences may result in a greater or lesser degree of accuracy, reliability, and desirability depending on the circumstances and the type of location determination techniques that are used. In circumstances in which a dual-mode mobile telecommunication device is able to communicate with either a WAN or a LAN, determining which network to access can therefore be a complicated problem.

DETAILED DESCRIPTION

Figure 1:
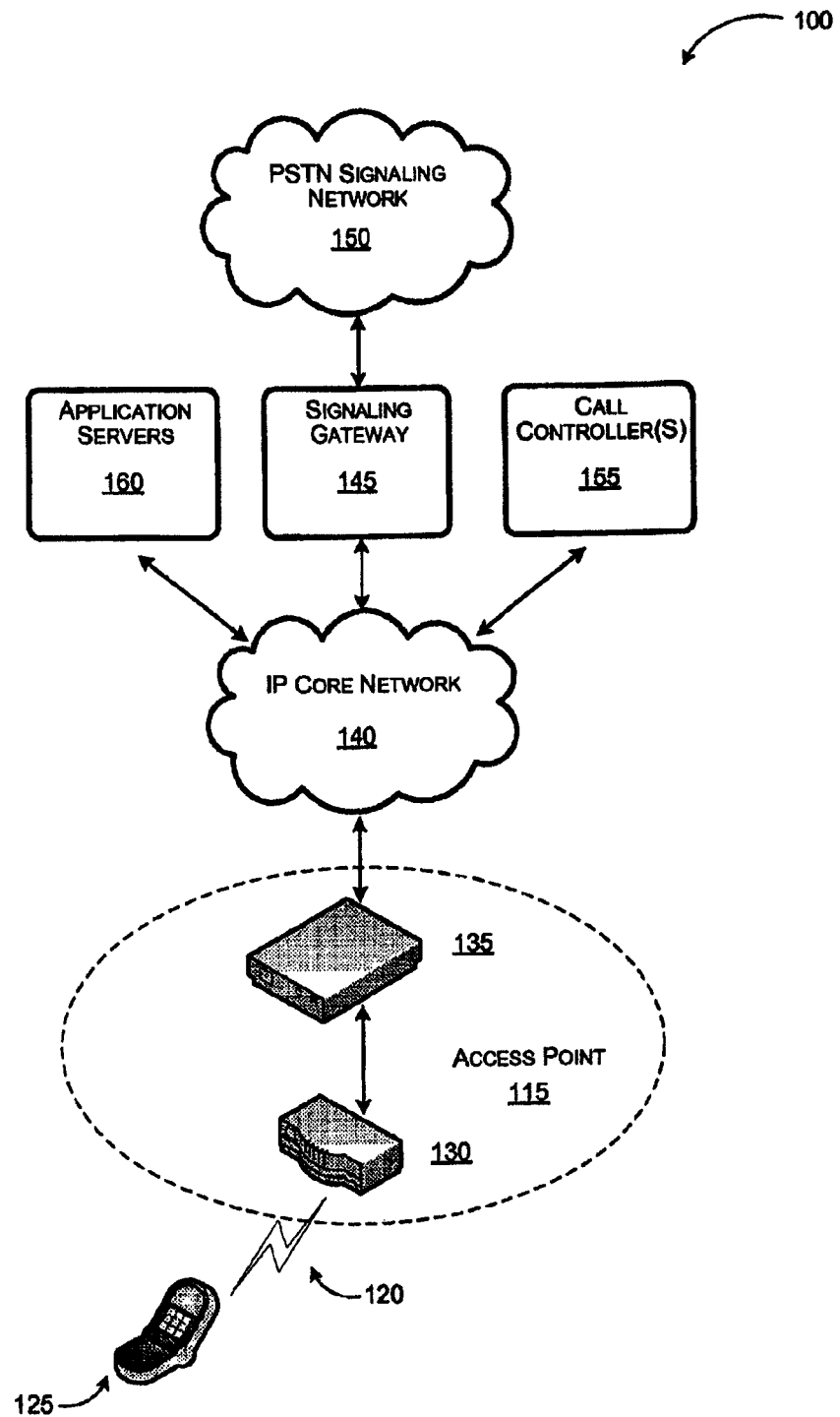
FIG. 1 is an illustration of a representative wireless access network having an Internet Protocol (IP) core.

A system and method to determine a type of wireless network that is to be used for an emergency communication session that is initiated at a mobile device is disclosed. A Session Initiation Protocol (SIP) header is modified to introduce an emergency call mode preference (ECMP) field into the header. When a mobile device registers a session with an IP Multimedia Subsystem (IMS), the ECMP field is populated by the service provider with information that conveys the preferred network to use when an emergency communication session is initiated by a user of the mobile device. In the event of a subsequent request to start an emergency communication session using the mobile device, the mobile device utilizes the preferred network to establish communication. By allowing the service provider to periodically update the preferred network and communicate the change in the ECMP field to the mobile device, the disclosed system and method allows greater flexibility to select a network that best suits the particular environment when the need arises to initiate an emergency communication session.

In some embodiments, the preferred network is specified based on the ability of the service provider to accurately determine the location of the mobile device. For example, if the mobile device is accessing an IP-based LAN access point and the location of the access point is known by the service provider to a desired resolution, then the contents of the ECMP field may direct the mobile device to initially attempt the emergency communication session using the IP-based access network. If, however, the location of the mobile device is not known by the service provider to a desired resolution, then the contents of the ECMP field may direct the mobile device to initially attempt the emergency communication session using a circuit-switched cellular network.

In some embodiments, the mobile device initiates an emergency communication session (either call or messaging session) using a first network dictated by the contents of the ECMP field, and, in the event of a failure to establish a session via the first network, deregisters from the first network and initiates an emergency communication session using a second network. For example, if an emergency call initiated in a cellular network fails, then the mobile device will deregister with the cellular network and initiate the emergency call in a second network (e.g., an IP-based network). If access to the second network fails, then the mobile device may attempt to access a third network (if available), or may re-attempt to initiate the emergency communication session using the first network.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

I. EXAMPLE IP-BASED WIRELESS TELECOMMUNICATIONS NETWORKS

FIG. 1 illustrates the components of a generalized Voice over Internet Protocol (VoIP) system 100 for mobile communication devices. The system comprises one or more access points (APs) 115 that can accept communications 120 from mobile devices 125. The access point includes a wireless router 130 and a broadband modem 135 that enable connection to an IP network 140. IP network 140 may be one or more public networks, private networks, or combination of public and private networks. IP packets that carry communications from the mobile device 125 are received at the access point 115 and transported through the IP network 140 to a signaling gateway 145. Signaling gateway 145 is typically operated by a service provider and converts the VoIP signal to a traditional phone service signal. The phone signal is then conveyed to the intended recipient via a public switched telephone network (PSTN) 150. A call controller 155 that is located in the service provider's network provides call logic and call control functions. An application server 160 that is located in the service provider's network provides logic and execution of one or more applications or services that are offered by the server provider, such as implementing various access and security rules.

The VoIP system depicted in FIG. 1 is an architecture that broadly enables a mobile device to receive IP-formatted telecommunication services. One example application of the described technology is for an Unlicensed Mobile Access (UMA) network that allows cellular service providers to offer their products and services seamlessly over Internet-connected broadband networks. Mobile devices may utilize licensed spectrums (such as spectrums for cellular communications) and alternate licensed, semilicensed and unlicensed spectrums (such as spectrums for IP-based wireless communication). For example, dual-mode cellular phones may access a cellular network, such as a GSM network, or an IP-based wireless network, such as a network based on the IEEE 802.16 (WiMAX), IEEE 802.20 Mobile Broadband Wireless Access (MBWA), Ultra Wideband (UWB), 802.11 wireless fidelity (Wi-Fi), or Bluetooth standards. The IP-based networks are accessed via wireless access points (APs) that are typically connected to a DSL (Digital Subscriber Line) modem, a cable modem, a satellite modem, or any other broadband Internet connection. The access points (APs) may be public or private, and may be located in a subscriber's home, in other apartments or residences, in public locations such as coffee shops, libraries, or schools, or in corporate locations.

When a mobile device accesses an IP-based wireless network, information is initially formatted in the cellular system's native protocol and then encapsulated into IP packets, transmitted to the access point (AP), and communicated over the Internet to the cellular service provider's mobile core network. Such transmissions bypass the service provider's existing network of radio towers. Because the same cellular protocols are used in communications involving IP access points as with traditional radio towers, the cellular service provider maintains a large degree of system compatibility even though using an IP-based network. The systems of the cellular service provider that deliver content and handle mobility may not even need to be aware that a subscriber's mobile device is on an IP-based wireless telecommunications network. The system may instead assume the mobile device is on its native cellular network. The IP network is therefore abstracted with respect to the cellular network, regardless of whether the mobile device connects to the cellular network via a base station (for licensed spectrum access) or a wireless access point (for licensed, semilicensed and/or unlicensed spectrum access).

A non-exhaustive list of products and services available on IP-based wireless telecommunications networks includes not only voice services, but also supplementary services like call forwarding and call waiting, text messaging services like SMS, and data-based services like ringtone downloads, game downloads, picture messaging, email and web browsing. Further, since a mobile device is connected to an IP network, a wide variety of data services available over such networks may be provided to the mobile device.

Figure 2A:
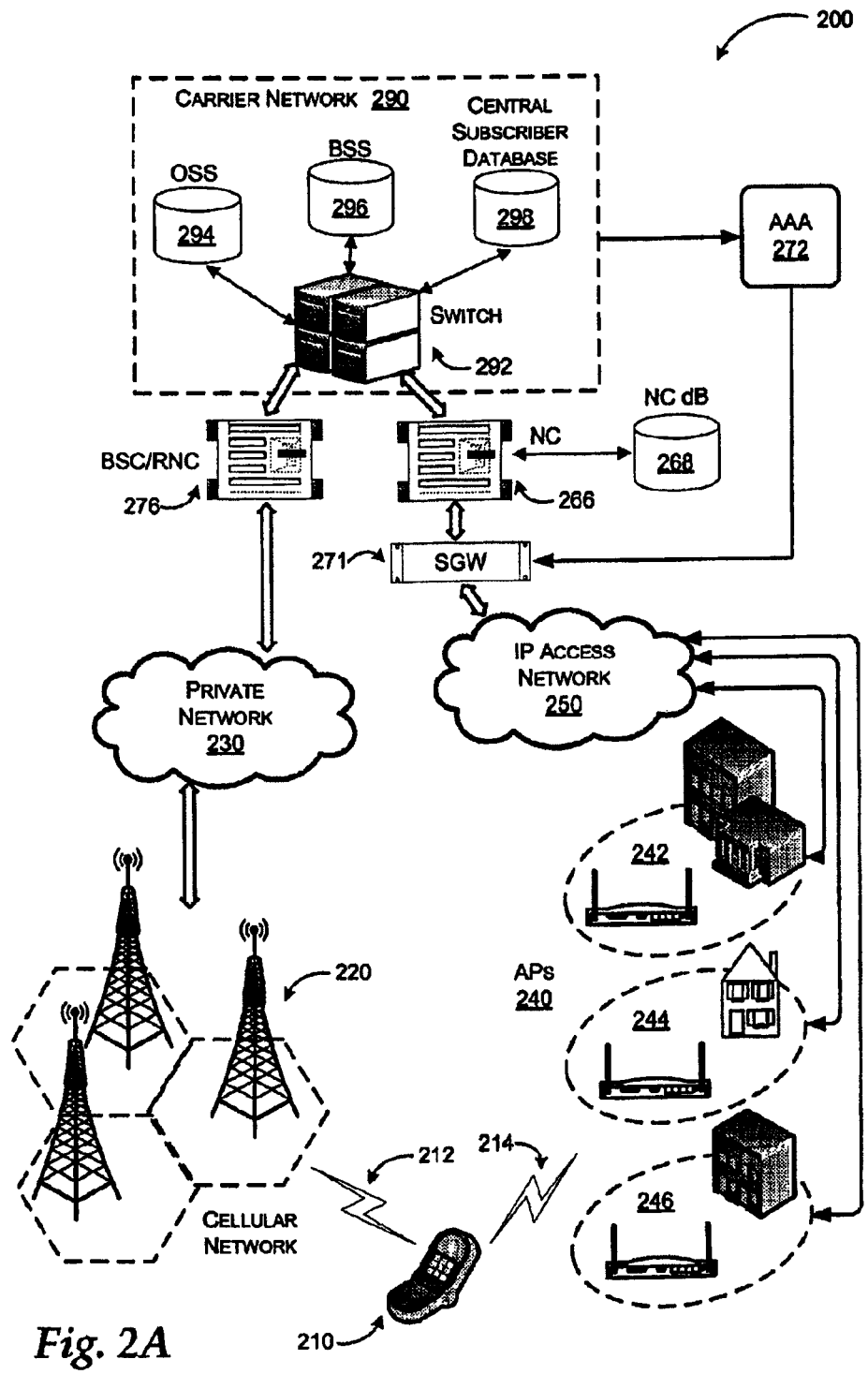
FIGS. 2A and 2B are illustrations of a representative converged wireless network combining a circuit-switched cellular network with an IP-based access network.

FIG. 2A is an illustration of an example system 200 that combines a cellular telephone network with an IP-based wireless telecommunications network into a converged wireless network. The described system 200 accepts registration requests and call connections from a mobile device 210 to either a cellular telephone network or to an IP-based wireless network.

The example cellular telephone network includes one or more cell towers 220 that are configured to accept cellular communications 212 from mobile device 210. The cell towers 220 are connected to a controller (such as a base station controller/radio network controller (BSC/RNC)) 276 via a private network 230. The private network 230 can include a variety of connections such as T1 lines, a wide area network (WAN), a local area network (LAN), various network switches, and other similar components. Cell tower controller 276 controls network communication traffic to the carrier network 290, where all communications are managed. An example carrier network 290 includes a switch (such as a mobile switching center (switch)) 292, which is configured to control data/call flows, perform load balancing, as well as other functions. A variety of system databases may also be accessed in the carrier network such as, e.g., an operation support subsystem (OSS) database 294, a business support system (BSS) database 296, and a central subscriber database that contains details of a carriers' subscribers (such as a home location register (HLR)) 298, for billing, call logging, etc.

The example IP-based wireless network includes one or more access points (APs) 240 that can accept IP communications 214 from mobile device 210. An access point can be configured as part of a wireless network in one or more locations such as a public network 242, a home network 244, or a private business network 246. Each access point is coupled to an IP network 250 through a broadband connection. IP packets that carry communications (data, voice, SMS, etc.) are routed from the access points to a security gateway (SGW) 271 through the IP network 250. The security gateway controls access to the network controller (such as a UMA Network Controller (UNC)) 266, which communicates with a database 268 for logging and/or accessing various data associated with communications. The network controller 266 is also configured to manage access with the carrier network 290 in a similar manner to that performed by the BSC/RNC 276.

Authentication of a request for access by a mobile device over the IP-based network is handled by the security gateway 271, which communicates with an authentication, accounting and authorization (AAA) module 272 as shown in FIG. 2A. Challenges and responses to requests for access by the mobile device are communicated between a central subscriber database 298 and the AAA module 272. When authorization is granted, the security gateway 271 communicates the assignment of an IP address to the mobile device 210 that requested access. Once the IP address is passed to the mobile device 210 by the security gateway 271, the public IP address assigned to the device is passed to the network controller 266.

Figure 2B:
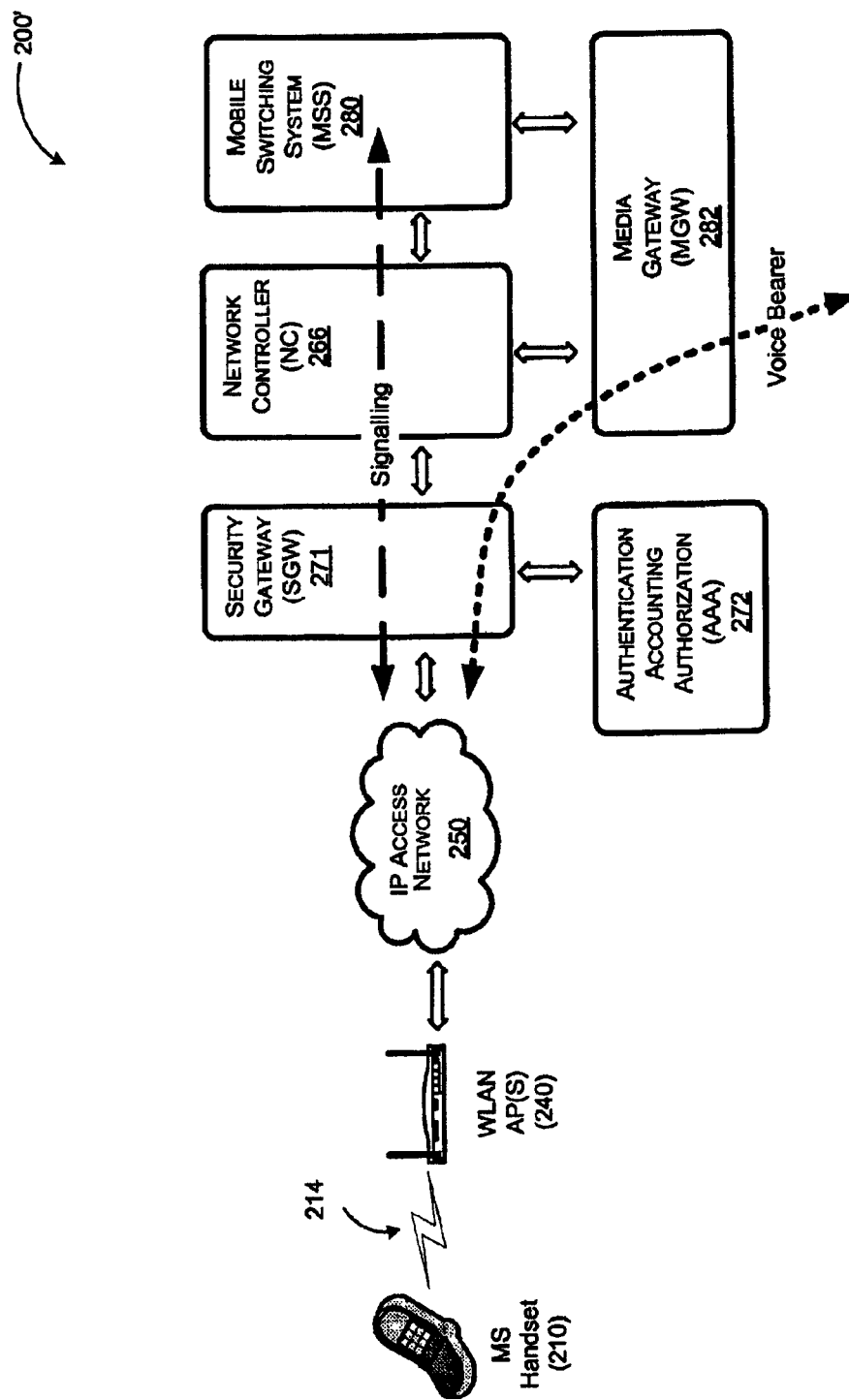

FIG. 2B illustrates another example system that combines a cellular telephone network with an IP-based network (in this case, a UMA network) into a converged wireless network. The described system 200' accepts registration requests and call connections from a mobile device 210 to either a cellular telephone network (not shown) or to an IP-based wireless network. The system 200' includes one or more access points (AP) 240 that accept communications 214 from mobile device 210. Each access point is coupled to an IP network 250 through a broadband connection. IP network 250 routes communications (data, voice, SMS, etc.) between the access points and a security gateway (SGW) 271. The security gateway 271 controls access to the network controller 266, which communicates with a database (not shown) for logging and accessing various data associated with communications. Authentication, accounting, and authorization are handled by SGW 271 via AAA module 272, as previously described.

For the example system 200', the signaling path of an IP-based call is routed through the network controller 266 to a mobile switching system (MSS) 280, while the voice bearer path is routed through the network controller 266 to a media gateway (MGW) 282. The signaling portion of a communication governs various overhead aspects of the communication such as, for example, when the call starts, when the call stops, initiating a telephone ring, etc. The voice bearer portion of the communication contains the actual content (either data or voice information) of the communication. The MGW 282 controls the content flow between the service provider and the mobile device 210, while the MSS 280 controls the signaling flow (or controls overhead-related flow) between the service provider and the mobile device 210.

Figure 2C:
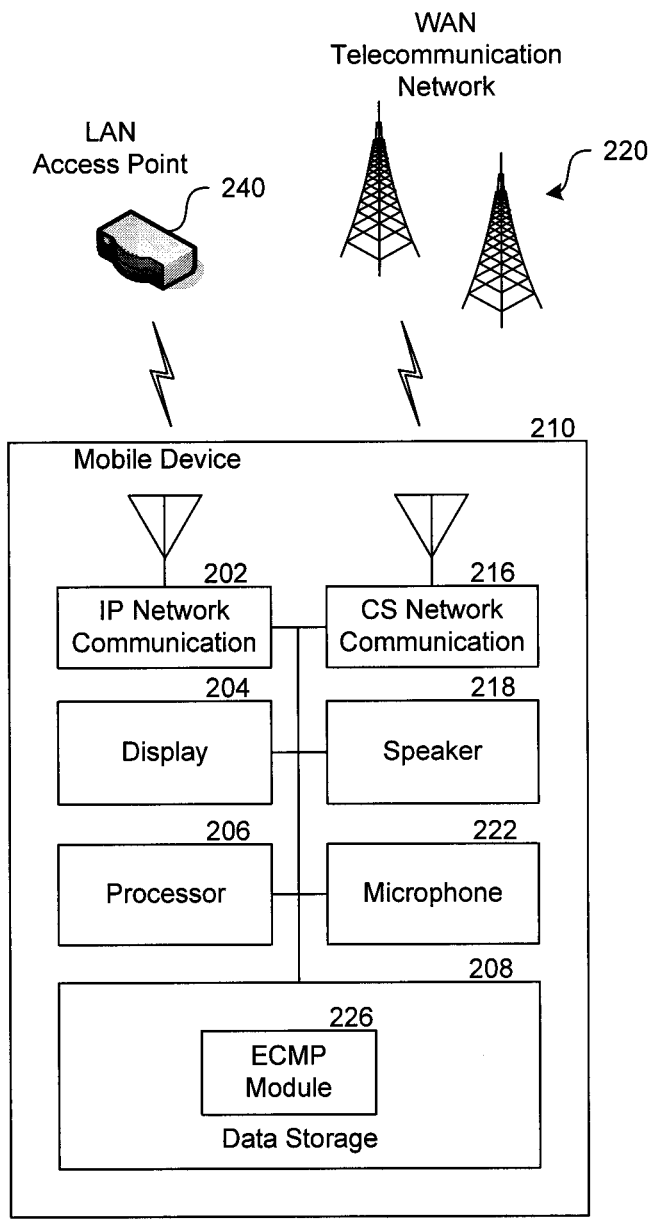
FIG. 2C is a block diagram of components in a mobile device, including an Emergency Call Mode Preference (ECMP) module.

FIG. 2C is a block diagram of representative components of the mobile device 210. The mobile device 210 includes a processor 206 and a data storage medium component 208 (e.g., a hard drive, flash memory, memory card, etc.) that stores program code that is executed by the processor. The processor 206 executes processing instructions in order to control or implement the various features disclosed herein, such as establishing communications sessions, transcoding of data, etc. One set of program code that is executed by the processor is code that implements an Emergency Call Mode Preference (ECMP) module 226. The ECMP module interprets the contents of an ECMP field in a Session Initiation Protocol (SIP) header and determines the preferred network to initially access during an emergency communication session. When an emergency communication session is subsequently requested by a user of the mobile device, the ECMP module 226 causes the mobile device 210 to initiate the emergency communication session using the preferred access network.

To allow a user to interact with and use communication and other services of the mobile device 210, the mobile device 210 may include a touchscreen display 204, a microphone 222, and a speaker 218. The mobile device 210 includes at least two communications components. The mobile device 210 includes a first wireless network communication component 202 that implements communication protocols to allow the mobile device 210 to establish IP-based communications sessions through access point 240 based on, for example, the 802.11 wireless fidelity (Wi-Fi) standard. The mobile device 210 also includes a second wireless network communication component 216 that implements communication protocols to allow the mobile device 210 to establish communications sessions through cell towers 220, based on, for example, the GSM standard.

II. EMERGENCY CALL MODE PREFERENCE

The Internet Protocol Multimedia Subsystem (IMS) is an architecture framework for delivering IP multimedia to mobile users, such as users of mobile devices. The IMS framework allows mobile devices to access multimedia, messaging, and voice applications and services. In order to establish a multimedia session, a mobile device will transmit a Session Initiation Protocol (SIP) request with its IP address to a SIP registrar server within an IMS network. Once registered, a mobile device may subsequently establish multimedia sessions via the IMS network. SIP requests and other SIP messages are defined by the 3rd Generation Partnership Project (3GPP) and set forth in various standards promulgated by the 3GPP organization.

Figure 3:
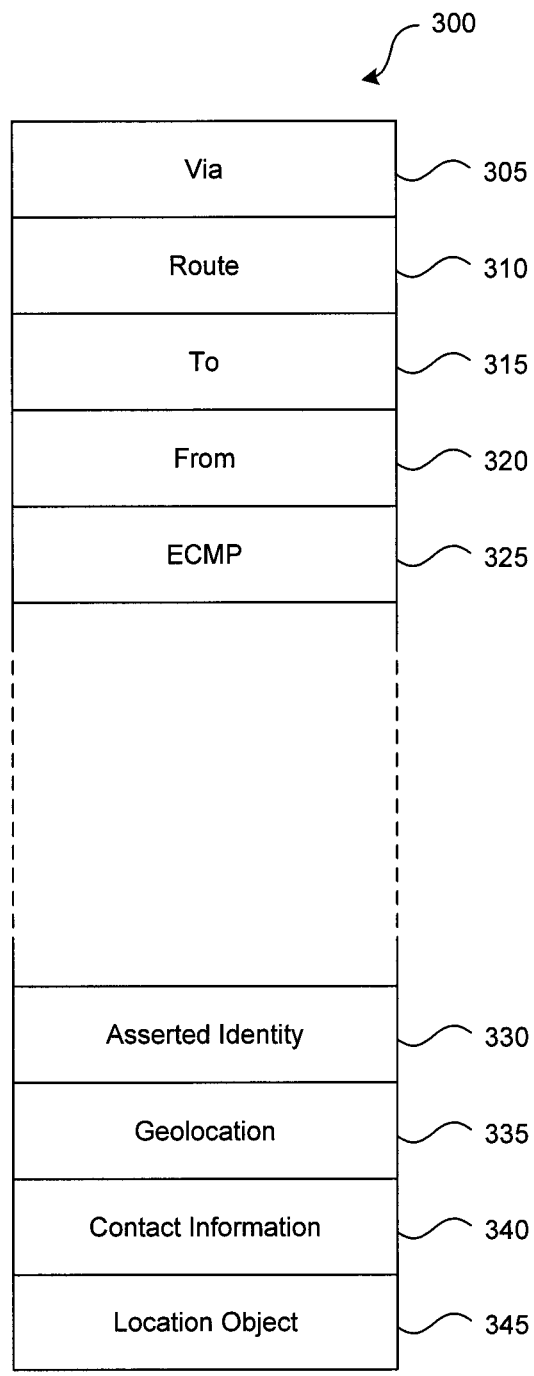
FIG. 3 is an illustration of a Session Initiation Protocol (SIP) header containing an Emergency Call Mode Preference (ECMP) field.

FIG. 3 depicts a SIP header 300 containing many of the standard fields that are specified by the 3GPP standard. The "To" field 315 and the "From" field 320 specify the original source and intended destination, respectively, of the SIP header. The "Via" field 305 and the "Route" field 310 specify the sender and intended recipient, respectively, of the current leg of the path between the source and destination. The "Asserted Identity" field 330 provides customized information identifying the sender's identity and may include a name and/or a telephone number for the sender. The sender's identity is generally separate from the "From" field 320, which provides network information for the calling device. The SIP header may also include other fields, such as a "Geolocation" field 335, a "Contact Information" field 340, and a "Location Object" field 345.

In addition to the standard information included in SIP headers, a service provider may specify additional fields that are appended to the existing fields. Procedures for modifying a SIP header are generally described in 3GPP RFC 3455, entitled "Private Header (P-Header) Extensions to the Session Initiation Protocol (SIP) for the 3rd-Generation Partnership Project (3GPP)," which is incorporated herein by reference in its entirety. The SIP header 300 in FIG. 3 has been modified to include an Emergency Call Mode Preference (ECMP) field 325. As will be described in additional detail herein, the ECMP field 325 contains an emergency call mode preference that has been specified by the service provider for the mobile device. The emergency call mode preference dictates the preferred network to initially use by the mobile device when starting an emergency session (e.g., a 911 voice call, an emergency text message, etc.). In some embodiments, for example, the ECMP field 325 contains values indicating that: (1) a circuit-switched (CS) network is preferred; or (2) an Internet Protocol (IP) network is preferred. When an emergency communication session is started by the mobile device, the mobile device will initially use the preferred network that is identified in the ECMP field.

The ECMP field 325 is populated by the service provider in response to the mobile device's initial request to register a multimedia session. The preferred network may be selected by, for example, identifying the networks that are currently accessible to the mobile device and determining a location determination accuracy that is supported by each of the accessible networks. The service provider may select one of the accessible networks that meets a threshold accuracy necessary to support the delivery of emergency services. If more than one network meets the minimum threshold necessary to provide emergency services, the service provider may utilize additional factors to select the preferred network. For example, the service provider may select a network having a best location-determination accuracy, a network having a lower current level of traffic, a network having a higher reliability, a network having lower latency, etc. When the preferred network has been selected, the IMS populates the ECMP field in a SIP response with the appropriate value representing the preferred network.

An advantage of allowing a service provider to specify a network to use is that the service provider may select the network that will provide better service to the user under an emergency situation. For example, if the mobile device is able to access two networks, one of the networks may provide a superior method of determining the current location of the mobile device. Some service providers, for example, may maintain a database of physical addresses that are associated with WiFi access points. The physical addresses contained in the database may provide more accurate position information than a position determined by a cellular network based on, for example, triangulation. In such circumstances, if the mobile device is able to access both the WiFi access point and the cellular network, the service provider may prefer that emergency calls be initiated using the WiFi access point since doing so will provide greater accuracy as to the position of the mobile device. In such circumstances, the service provider will therefore populate the ECMP field with the appropriate value indicating that the WiFi access point is the preferred network to use. By dynamically indicating the preferred network to use, the service provider is able to better ensure that emergency services are provided the mobile device user.

When the SIP header 300 is received by the mobile device, the contents of the ECMP field 325 are parsed by the system and stored as a preferred network to use in the event of an emergency communication session request. If subsequent SIP headers are received with different preferred networks contained in the ECMP field 325, the system may overwrite the previously-stored preferred network and store in its place the newly-received preferred network. In this fashion, the mobile device will maintain the most recent preferred network that is provided by the service provider.

Although FIG. 3 illustrates the ECMP field 325 as being adjacent to the "From" field 320, the ECMP field 325 may be positioned at other locations within the SIP header. Moreover, although the ECMP field has been characterized as containing a type of network for the mobile device to initially use, the ECMP field may contain other information such as an identity of a specific network to use, an indication of a specific service provider to use, an order of networks to use, etc. Additional parameters that may be used by the system in the selection of a preferred network may also be provided in the ECMP field. For example, the ECMP field may specify that a first network should be used if the signal strength from that network exceeds a minimum threshold, otherwise a second network should be used.

Figure 4:
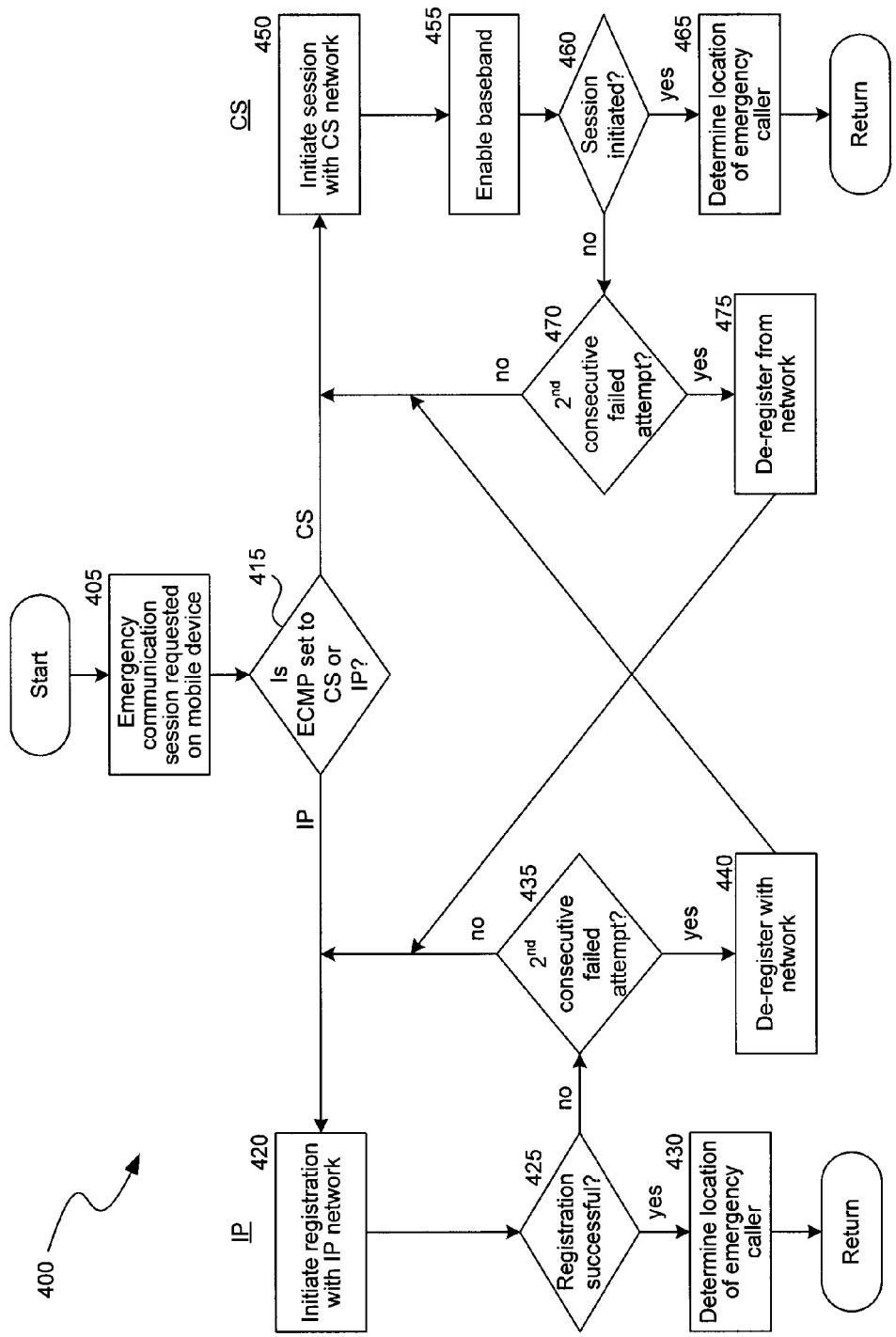
FIG. 4 is a flow chart of a process implemented in a mobile device to establish an emergency communication session based on the contents of the ECMP field.

FIG. 4 is a flow diagram of a process 400 implemented by a mobile device when initiating an emergency communication session. The depicted process contemplates attempting to access a preferred network that is dictated by the contents of the ECMP field. If the preferred network is not available, access is attempted via a secondary network that is different from the first. Specifically, blocks 420 to blocks 440 depict starting an emergency communication session in an IP (packet-based) network, and blocks 450 to blocks 475 depict starting an emergency communication session in a circuit-switched (CS) network. Which network is utilized first by the mobile device depends on the contents of the ECMP field.

At a block 405, a user of a mobile device initiates an emergency communication session. The emergency communication session may be a voice call (e.g., a 911 call), a text message, or any other emergency request. At decision block 415, the ECMP module determines the preferred network to use for the emergency communication request. The preferred network is dictated by the contents of the previously-received ECMP field. The contents of the ECMP field may specify that the mobile device use an IP (i.e., packet-based) network. Alternatively, the contents of the ECMP field may specify that the mobile device use a circuit-switched (CS) network. As noted herein, although FIG. 4 only depicts the use of two networks, it will be appreciated that a greater number of network options from which to select may be implemented and dictated by the contents of the ECMP field.

If the previously-received ECMP field contained values indicating that the preferred network was an IP-based network, at block 420 the mobile device attempts to initiate a communication session via the IP network. At a decision block 425, a test is made to determine whether the session has been successfully started and connectivity achieved with an emergency responder. If the session has been successfully started, processing continues to a block 430 where one or more processes may be initiated to determine the location of the emergency caller. If the session has not been successfully started, however, processing continues to a decision block 435 where a test is made to determine if two consecutive attempts to establish a communication session through the IP-based network have failed. If there has only been a single failed attempt, blocks 420 and 425 are repeated and access to the network is attempted a second time. If there have been two consecutive failures to access the network at block 435, processing continues to a block 440. At block 440, the system deregisters or otherwise cancels any session requests via the IP-based network. The system then ceases use of the IP-based network, and attempts access using the CS network.

If at decision block 415 the previously-received ECMP field contained values indicating that the preferred network was a CS network, at block 450 the mobile device attempts to initiate a communication session via the CS network. At a block 455, the system enables the baseband processor of the mobile device. At a decision block 460, a test is made to determine whether the session has been successfully started and connectivity achieved with an emergency responder. If the session has been successfully started, processing continues to a block 465 where one or more processes may be initiated to determine the location of the emergency caller. If the session has not been successfully started, however, processing continues to a decision block 470 where a test is made to determine if two consecutive attempts to establish a communication session through the CS network have failed. If there has only been a single failed attempt, blocks 450-460 are repeated and access to the network is attempted a second time. If there have been two consecutive failures to access the network at block 470, processing continues to a block 475. At block 475, the system deregisters with the CS network. The system then ceases use of the CS network, and attempts access using the IP-based network.

It will be appreciated that the actual test at decision block 460 to determine whether a session has been successfully started and connectivity achieved with an emergency responder may vary depending on the network and software running on the mobile device. For example, it may be possible for the ECMP module to detect when ringing has commenced when making an emergency call. Although ringing does not provide absolute certainty that the associated call will be connected with an emergency responder, the likelihood of the call failing at that point is very low. As a result, the ECMP module may therefore treat the call as having been started and connectivity achieved with an emergency responder and not continue to decision block 470. Other indications of the likelihood of successfully establishing a session or registering with the network may also be used by the mobile device at decision blocks 425 or 470. An advantage of, for example, relying on a determination of whether a connection is ringing is that it increases the speed at which a successful network connection is established using process 400.

While the exemplary networks depicted in FIG. 4 are CS and IP networks, it will be appreciated that other network types can be specified by the ECMP field. Moreover, even though two networks are depicted in FIG. 4, it will be further appreciated that more than two networks may be used. For example, if three networks are available for use, the ECMP field may specify a primary network preference and a secondary network preference. Although a UMA network is depicted in FIGS. 2A and 2B, it will be appreciated that the IMS may operate on networks other than a UMA network. The changes to the SIP header disclosed herein are therefore applicable to any IMS core network.

In some embodiments, a time delay may be introduced between a failed emergency communication session attempt and a second emergency communication session attempt. For example, if an emergency communication session fails to be initiated, a delay may be introduced before making a second or subsequent connection attempt following decision blocks 435 and 470. Introducing a delay allows transient network conditions or other error conditions to clear before re-attempting the communication attempt. Such delay may be very short, or may extend for 10 or more seconds to allow network conditions to clear.

In some embodiments, the ECMP field may contain other conditions associated with the preferred network that is specified by the field. For example, a minimum signal strength may be associated with the preferred network. If the signal strength of the preferred network does not equal or exceed the minimum specified signal strength, the mobile device may default to a secondary network instead when initiating an emergency communication session.

In some embodiments, the preferred network specified in the ECMP field may be overridden by the mobile device if the mobile device has a certain degree of confidence that a location stored by the mobile device currently reflects the accurate location of the mobile device. For example, if the mobile device has a recently-stored GPS location that pinpoints the location of the mobile device, the mobile device may access any network since the location of the mobile device is known (or at least known to a certain degree of confidence) and the particular location-determination capabilities of the network are irrelevant when establishing the communication session. When the location estimate stored by the mobile device exceeds a threshold level, the mobile device may elect to use the preferred network or may opt to use a different network.

III. EXAMPLE LOCATION DETERMINATION OF EMERGENCY CALLER

Figure 5:
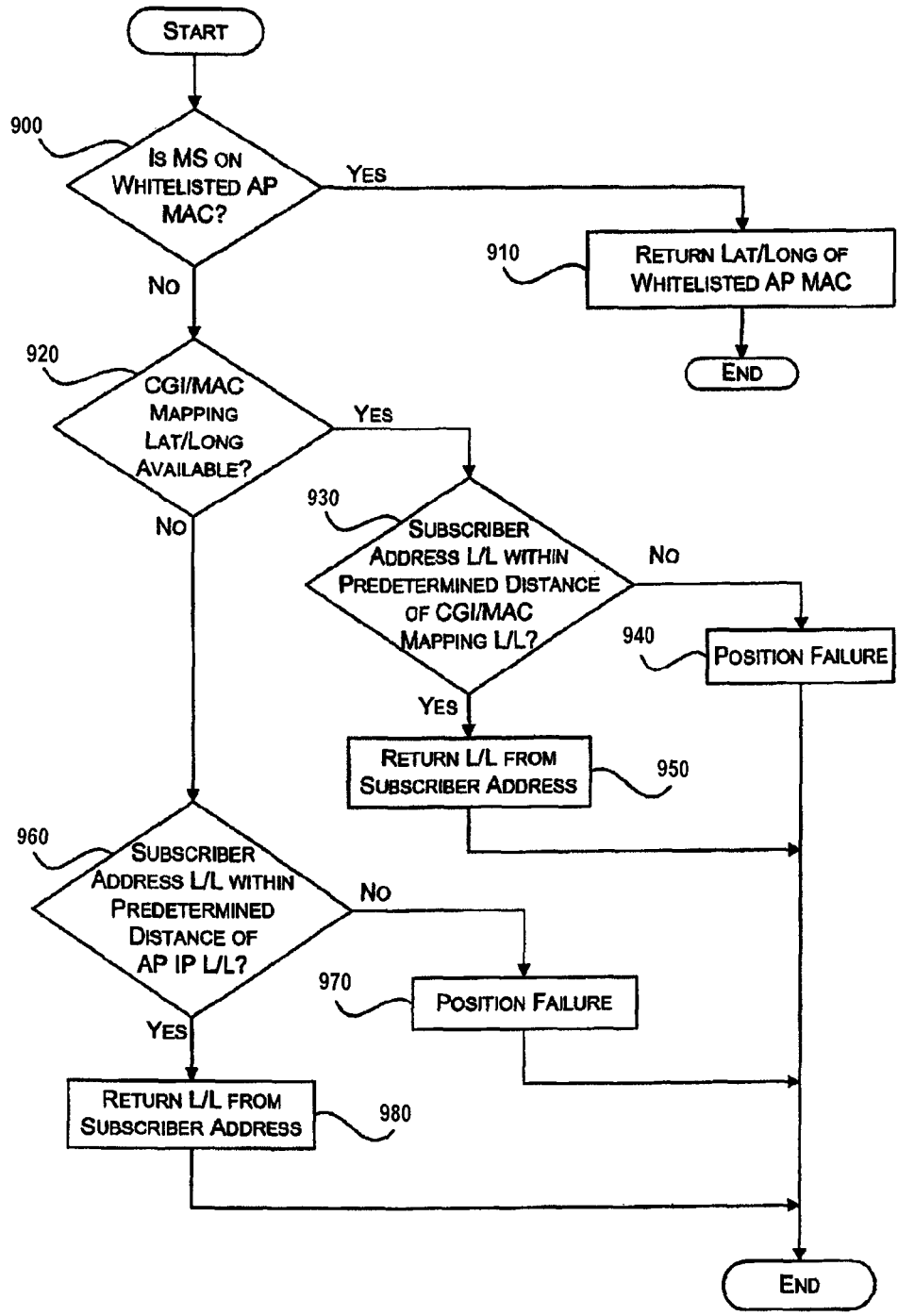
FIG. 5 is a flow chart of a representative process for estimating the location of a mobile device user.

Once the mobile device has established connectivity with a network, the emergency communication session may proceed. In order to route the emergency communication to the appropriate Public Safety Answering Point (PSAP) or other emergency responder, the location of the mobile device is determined. Techniques for estimating the position of a mobile device in a cellular network are well known, such as cell identification, triangulation, and use of timing signals, and are not described herein. FIG. 5 illustrates an exemplary process for estimating the location of a mobile device of an emergency caller that utilizes an access point to access an IP network. As will be described in additional detail herein, the location estimate may be derived from: (1) the geographic location data of the access point on which the mobile device establishes an IP connection with the network controller (NC); (2) a mobile subscriber's home location when the subscriber accesses the network from home; (3) the last known cell global identity (CGI) associated with the mobile device; or (4) the public IP address of the mobile computing device.

At a decision block 900, a determination is made whether the mobile device is accessing the network via an access point that is identified on a whitelist. The whitelist is a database of location information for access points that a service provider owns and operates, or otherwise has location information for. The location information includes the MAC address associated with the access point. If the caller is initiating a call from a whitelisted access point, processing continues at block 910 where the latitude/longitude coordinates associated with the MAC address of the access point is returned as the location of the mobile device. If the mobile device is accessing the network via an access point that is not identified on the whitelist, processing continues to decision block 920 where a determination is made whether a CGI to MAC address mapping of latitude/longitude coordinates is available. The CGI to MAC address mapping of latitude/longitude coordinates may be maintained in a database managed by the service provider. If a CGI to MAC address mapping of latitude/longitude coordinates is available, processing continues to decision block 930. If a CGI to MAC address mapping of latitude/longitude coordinates is not available, processing continues to decision block 960.

At decision block 930, a determination is made whether the CGI to MAC address mapping of latitude/longitude coordinates is within a first predetermined distance (e.g., 5 kms) of latitude/longitude coordinates of an address associated with the mobile device. If the CGI to MAC address mapping of latitude/longitude coordinates is not within the predetermined distance of latitude/longitude coordinates of the address provided by the mobile subscriber, processing continues to block 940 where a position failure results. If the CGI to MAC address mapping of latitude/longitude coordinates is within the predetermined distance of latitude/longitude coordinates of the address provided by the mobile subscriber, processing continues to block 950 where the latitude/longitude coordinates associated with the mobile subscriber's address is returned as the location of the mobile device.

Continuing to decision block 960, a determination is made whether the latitude/longitude coordinates of the IP address of the access point is within a second predetermined distance (e.g., 10 kms) of the latitude/longitude coordinates of an address provided by the mobile subscriber. If the latitude/longitude coordinates of the access point IP address is not within the predetermined distance of latitude/longitude coordinates of the address provided by the mobile subscriber, processing continues to block 970 where a position failure results. If the latitude/longitude coordinates of the access point IP address is within the predetermined distance of latitude/longitude coordinates of the address provided by the mobile subscriber, processing continues to block 980 where the latitude/longitude coordinates associated with the mobile subscriber's address is returned as the location of the mobile device.

The location of a mobile device is therefore determined based on the latitude/longitude coordinates of at least one of: an access point, a cell tower, an IP address, and a subscriber provided address. In cases where the location determination is being made for non-emergency purposes, the location determination may be associated with an uncertainty rating that identifies the reliability of the location determination. For example, latitude/longitude coordinates for a cell tower may have an uncertainty rating of 15 kms. Latitude/longitude coordinates for an access point identified by MAC address may have an uncertainty rating of 50 kms. Latitude/longitude coordinates for an access point at a specific known location may have an uncertainty rating of 100 meters. Latitude/longitude coordinates for a subscriber provided address may have an uncertainty rating of 200 meters. A request to locate the mobile device may identify a minimum accuracy requirement such that the location determination with the highest uncertainty rating that satisfies the request is returned.

In some situations, a mobile device may have the ability to determine its own location utilizing global positioning system (GPS) technology. GPS data (e.g., lat/long coordinates) from the mobile device can then be communicated to the network controller (NC) during the registration process. The network controller can subsequently store the GPS data in a database. Once stored, the GPS data may be used as additional data to help locate other non-GPS devices that access the network.

IV. CONCLUSION

The above description of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention.

We claim:

1. A method in a mobile device of selecting a network to initiate an emergency communication session, the method comprising:
  receiving a Session Initiation Protocol (SIP) header from an IP multimedia subsystem in response to an initial request to register a multimedia session;
  parsing the SIP header to identify an emergency call mode preference field,
    wherein the emergency call mode preference field contains an indication of a preferred network to utilize in the event of a request to initiate an emergency communication session,
    wherein the preferred network is specified as a network type,
    wherein the network type includes at least an identification of an Internet Protocol (IP) network or a cellular network, and
    wherein the preferred network is further identified based on a current level of traffic of the network, a reliability of the network, and a latency of the network;
  determining that an emergency communication session has been requested by a mobile device user; and
  attempting to initiate a subsequent request for an emergency communication session via the preferred network.

2. The method of claim 1, wherein the SIP header is populated by a service provider associated with the mobile device.

3. The method of claim 1, wherein the method further comprises:
  if the attempt to initiate an emergency communication session is unsuccessful on the preferred network, attempting to initiate an emergency communication session on a different network.

4. The method of claim 3, wherein the method further comprises attempting to initiate an emergency communication session on the preferred network at least twice before attempting to initiate an emergency communication session on the different network.

5. The method of claim 4, wherein the method further comprises instituting a delay prior to each attempt to initiate an emergency communication session.

6. The method of claim 1, wherein the emergency communication session is a voice call or a text message.

7. A method in an Internet Protocol Multimedia Subsystem (IMS) of communicating to a mobile device a preferred network to use in an event of an emergency, the method comprising:
  receiving from a mobile device an initial Session Initiation Protocol (SIP) request to establish a multimedia session via the Internet Protocol Multimedia Subsystem (IMS);
  identifying a preferred network that the mobile device should utilize when attempting a subsequent request for an emergency communication session,
    wherein the preferred network includes an Internet Protocol (IP) network or a cellular network,
    wherein the preferred network is further identified based on a current level of traffic of the network, a reliability of the network, and a latency of the network, and
    wherein the preferred network provides a desired level of accuracy when determining the location of the mobile device; and
  inserting an indication of the preferred network into a SIP response to the mobile device.

8. The method of claim 7, wherein the indication of the preferred network is inserted into a header of the SIP response and wherein the SIP header is populated by a service provider associated with the mobile device.

9. The method of claim 7, wherein the preferred network is identified by:
- identifying networks that are currently accessible to the mobile device;
- determining a location determination accuracy that is supported by each of the accessible networks; and
- selecting a preferred network meeting the desired level of accuracy from the accessible networks.

10. A mobile device configured to initiate an emergency communication session via a preferred network, the mobile device comprising:
- a first communication component configured to communicate on a first type of network;
- a second communication component configured to communicate on a second type of network; and
- an emergency call mode preference module configured to:
  - parse a Session Initiation Protocol (SIP) header from an initial request to an IP multimedia subsystem to identify a preferred network type to utilize in the event of a request to initiate an emergency communication session,
    - wherein the preferred network is specified as a network type,
    - wherein the preferred network type is an Internet Protocol (IP) network or a cellular network; and
  - in response to a subsequent request to initiate an emergency communication session, initiating an emergency communication session via the first communication component if the preferred network is the first type of network or via the second communication component if the preferred network is the second type of network,
    - wherein the preferred network is selected based on a current level of traffic of the network, a reliability of the network, and a latency of the network.

11. The mobile device of claim 10, wherein the emergency call preference module is further configured to initiate an emergency communication session on the other type of network if the emergency communication session is unsuccessful on the preferred network.

12. The mobile device of claim 11, wherein the emergency call preference module is further configured to attempt to initiate an emergency communication session on the preferred network at least twice before attempting to initiate an emergency communication session on the other network.

13. The mobile device of claim 12, wherein the emergency call preference module is further configured to introduce a time delay prior to each attempt to initiate an emergency communication session.

14. The mobile device of claim 10, wherein the emergency communication session is a voice call or a message.

15. A non-transitory computer-readable medium containing instructions that, when executed by a processor, generate an improvement to a header in a Session Initiation Protocol (SIP) message that is sent in response to an initial SIP request from a mobile device, the improvement comprising:
- an emergency call mode preference field that contains an indication of a preferred network that should be utilized by the mobile device when initiating a subsequent request for an emergency communication session, the preferred network selected at least in part on an accuracy of a location determination of the mobile device that may be made by the preferred network,
- wherein the indication of a preferred network is a type of network,
- wherein the type of network is an Internet Protocol (IP) network or a cellular network, and
- wherein the preferred network is further selected based on a current level of traffic of the network, a reliability of the network, and a latency of the network.

16. The computer-readable medium of claim 15, wherein the SIP header is populated by a service provider associated with the mobile device.

\* \* \* \* \*